United States Patent
Kokko et al.

(10) Patent No.: US 7,041,197 B2
(45) Date of Patent: May 9, 2006

(54) WET STRENGTH AND SOFTNESS ENHANCEMENT OF PAPER PRODUCTS

(75) Inventors: Bruce J. Kokko, Neenah, WI (US); David W. White, Clintonville, WI (US)

(73) Assignee: Fort James Corporation, Atlanta, GA (US)

( * ) Notice: Subject to any disclaimer, the term of this patent is extended or adjusted under 35 U.S.C. 154(b) by 18 days.

(21) Appl. No.: 10/413,693

(22) Filed: Apr. 15, 2003

(65) Prior Publication Data

US 2004/0206466 A1 Oct. 21, 2004

(51) Int. Cl.
*D21H 17/43* (2006.01)

(52) U.S. Cl. .................. 162/167; 162/168.2; 524/35
(58) Field of Classification Search ............... 162/167, 162/168.2; 524/35
See application file for complete search history.

(56) References Cited

U.S. PATENT DOCUMENTS

| | | | |
|---|---|---|---|
| 3,058,873 A | 10/1962 | Keim et al. | |
| 3,138,473 A | 6/1964 | Floyd et al. | |
| 3,248,280 A | 4/1966 | Hyland | |
| 3,434,984 A | 3/1969 | Hyland | |
| 3,448,005 A | 6/1969 | Allison et al. | |
| 3,462,383 A | 8/1969 | Longoria, III et al. | |
| 3,483,077 A * | 12/1969 | Aldrich ................ | 162/158 |
| 3,632,559 A | 1/1972 | Matter et al. | |
| 3,635,842 A | 1/1972 | Longoria, III et al. | |
| 3,692,092 A | 9/1972 | Longoria | |
| 3,755,220 A | 8/1973 | Freimark et al. | |
| 3,980,663 A * | 9/1976 | Gross .................. | 524/389 |
| 4,066,494 A | 1/1978 | Scharf et al. | |
| 4,200,559 A | 4/1980 | Peterlein et al. | |
| 4,517,285 A | 5/1985 | Woodward et al. | |
| 4,596,863 A | 6/1986 | Sackmann et al. | |
| 4,722,964 A | 2/1988 | Chan et al. | |
| 5,298,568 A | 3/1994 | Suzuki | |
| 5,491,190 A * | 2/1996 | Sandvick et al. ........... | 524/322 |
| 5,969,011 A | 10/1999 | Frölich et al. | |
| 6,222,006 B1 * | 4/2001 | Kokko et al. ............... | 528/332 |
| 6,488,812 B1 | 12/2002 | Shannon et al. | |
| 2002/0096282 A1 * | 7/2002 | Leibler et al. ........... | 162/164.1 |
| 2003/0024667 A1 | 2/2003 | Wallenius et al. | |
| 2003/0127209 A1 * | 7/2003 | Sandberg et al. ........ | 162/164.6 |

FOREIGN PATENT DOCUMENTS

| | | |
|---|---|---|
| CA | 2296826 | 7/2000 |
| CA | 2296892 | 7/2000 |
| CA | 2296894 | 7/2000 |
| EP | 0 471 137 A1 | 2/1992 |
| EP | 1 258 560 A1 | 11/2002 |
| WO | WO 93/21382 | 10/1993 |
| WO | WO 98/39376 | 9/1998 |
| WO | WO 00/43423 | 7/2000 |
| WO | WO 00/43428 | 7/2000 |
| WO | WO 00/43429 | 7/2000 |
| WO | WO 00/43440 | 7/2000 |
| WO | WO 01/40578 A1 | 7/2001 |
| WO | WO 01/77437 A1 | 10/2001 |

OTHER PUBLICATIONS

Epo Communication, App. No. 04101554.6-2124-International Search Report, PCT/US00/32820, Feb. 14, 2001.

* cited by examiner

*Primary Examiner*—Melanie Bissett
(74) *Attorney, Agent, or Firm*—Dilworth & Barrese, LLP

(57) ABSTRACT

A method for making paper to enhance its wet strength includes adding separately to a cellulosic paper pulp furnish the following additives to form a treated pulp: a cationic wet strength resin whose cationic sites bond to anionic sites of cellulose fibers contained in the paper pulp furnish, and a hydrophobically modified anionic polyelectrolyte whose anionic sites bond with cationic sites of the cationic wet strength resin.

9 Claims, No Drawings

WET STRENGTH AND SOFTNESS ENHANCEMENT OF PAPER PRODUCTS

BACKGROUND OF THE INVENTION

1. Field of the Invention

The present disclosure relates generally to the field of making disposable paper products and, more specifically, to the enhancement of the softness and wet strength characteristics of paper tissue and towels.

2. Description of Related Art

It is often desirable to increase the wet strength of paper products. For example, paper towels are typically used to wipe up wet spills and need sufficient strength when wet to prevent disintegration in use. Typically, wet strength is evaluated in relation to dry strength. A wet strength paper grade has a wet strength of at least about 10% to 15% of its dry strength.

The wet strength of a paper can be enhanced by treating the paper pulp slurry, or "furnish", with a reactive polymeric material such as polyamidoamine-epichlorohydrin ("PAE"), melamine-fomaldehyde ("MF") or urea-formaldehyde ("UF") resins.

PAE is commonly used. However, it has been found that certain additives, when used in conjunction with PAE, enhance the wet strength of the paper even further. For example, U.S. Pat. No. 3,058,873 discloses the use of a water soluble gum such as carboxymethylcellulose ("CMC") to enhance the wet strength efficiency of PAE. Although CMC is effective it suffers from disadvantages. In particular, CMC requires the installation of expensive equipment, and undissolved CMC can form deposits which interfere with the operation of the paper making machinery.

U.S. Pat. No. 6,222,006, which is herein incorporated by reference, discloses an aqueous formulation of a high solids content wet strength resin which is the product of a reaction between an epihalohydrin and an end-capped polyaminamide polymer.

Another consideration which arises with paper for use as facial tissue, table napkins, paper towels, is that of softness. The tactile feeling of softness can be enhanced by decreasing dry strength and/or increasing the lubricity of the paper. This can be done by, for example, introducing hydrophobic groups into the paper as part of cationic or anionic surface active agents. However, surfactant molecules are relatively small and do not easily remain on the surface of the paper fibers because they are poorly retained and have a tendency to migrate into the fiber walls, thereby losing effectiveness. Also, surfactants can reduce wet strength as well as dry strength.

What is needed is an improved method for increasing the wet strength of paper, while giving the paper a more cloth-like feel, or softness.

BRIEF SUMMARY OF THE INVENTION

A method is provided herein for making a cellulosic paper to enhance its wet strength and softness. The method comprises:

a) providing a pulp furnish containing at least one cellulosic component possessing anionic sites;

b) adding separately to the pulp furnish to form a treated pulp, i. cationic wet strength resin possessing cationic sites which bond to anionic sites on the cellulosic component of the pulp furnish, there being present cationic wet strength resin possessing unbound cationic sites, and ii. anionic polyelectrolyte possessing anionic sites and hydrophobic groups, with anionic sites of the anionic polyelectrolyte bonding to unbound cationic sites of the wet strength resin;

c) forming the treated pulp into a sheet; and, d) drying the sheet.

Preferably, the cationic wet strength resin has azetidinium or epoxide functionality.

Preferably, the anionic polyelectrolyte is made by reacting a polymeric compound having anhydride groups with an amine having the formula:

$HNR^1R^2$ wherein $R^1$ and $R^2$ are each selected from the group consisting of hydrogen and a saturated or unsaturated, straight or branched aliphatic group having from 1 to 36 carbon atoms, with the proviso that at least one of $R^1$ and $R^2$ is a hydrophobic saturated or unsaturated, straight chain or branched aliphatic group having from about 8 to about 36 carbon atoms.

The method advantageously increases the wet strength and the wet/dry tensile strength ratio while using less additive. Also, the hydrophobically modified anionic polyelectrolyte disclosed herein provides a liquid substitute for CMC as well as being a molecular carrier for non-ionic softeners such as Guerbet alcohols.

DETAILED DESCRIPTION OF THE INVENTION

The present invention employs a hydrophobically modified anionic polyelectrolyte ("HMAP") as a wet strength enhancement additive in conjunction with a wet strength resin agent to provide increased wet strength and a high wet/dry tensile strength ratio. The term "polyelectrolyte" refers to water soluble molecules having many repeating units, some or all of which have charged functions.

The wet strength resin agent can be any cationic resin which can form a covalent or ionic bond with cellulose fibers. Preferred cationic wet strength resins include those having azetidinium or epoxide functionality. Such resins include polyamidoamine-epichlorohydrin (PAE) resin, poly(diallylamine)-epichlorohydrin resin, polyalkylene polyamine-epichlorohydrin resin (PAPAE). Quaternary ammonium epoxide resins are also useful. Other cationic wet strength resins include melamine-formaldehyde resins and urea-formaldehyde resin.

A particularly suitable wet strength agent is PAE, which contains cationic sites which form ionic bonds with the carboxyl sites on the cellulosic pulp fibers. PAE suitable for use as a wet strength agent is commercially available from various suppliers. A PAE wet strength agent suitable for use in the present invention is commercially available under the designation AMRES LA-12 from Georgia-Pacific Corp. of Atlanta, Ga.

The amount of wet strength agent used preferably ranges from about 1 pound per metric ton to 30 pounds per metric ton of dry fiber, more preferably from about 10 pounds per metric ton to about 20 pounds per metric ton.

The preferred amount of wet strength agent depends upon the demand for a given furnish. In practice, one first determines the wet strength resin demand of a furnish (i.e., the amount of wet strength resin needed to bond to the anionic sites of the cellulosic component of a pulp furnish), and then determines the excess amount of wet strength resin needed to achieve the desired wet strength. Being anionic, the HMAP molecules of the present invention attach to the excess cationic sites of the wet strength resin.

The papermaking fibers useful in the present invention include both bleached and unbleached hardwood fibers, bleached or unbleached softwood fibers, bleached or unbleached recycled fibers, synthetic fibers, non-woody fibers, and blends of the aforementioned fiber types. For paper towels, particularly suitable fibers include bleached softwood kraft, and bleached softwood chemithermomechanical pulp ("BCTMP").

In one embodiment, the HMAP compound of the present invention is made by reacting a polymer containing anhydride groups with a primary or secondary amine having the formula:

$$HNR^1R^2$$

wherein $R^1$ and $R^2$ are each selected from the group consisting of hydrogen and a saturated or unsaturated, straight chain or branched aliphatic group having from 1 to 36 carbon atoms, with the proviso that at least one of $R^1$ and $R^2$ is a hydrophobic saturated or unsaturated, straight chain or branched aliphatic group having from about 8 to about 36 carbon atoms, preferably from about 12 to 24 carbon atoms. Suitable preferred primary and secondary amines include for example, octylamine, decylamine, dodecylamine, tridecylamine, tetradecylamine, pentadecylamine, hexadecylamine, heptadecylamine, octadecylamine, nonadecylamine, eicosylamine, N-methyl-N-octylamine, N-methyl-N-decylamine, N-methyl-N-dodecylamine, N-methyl-N-tridecylamine, N-methyl-N-tetradecylamine, N-methyl-N-pentadecylamine, N-methyl-N-hexadecylamine, N-methyl-N-heptadecylamine, N-methyl-N-octadecylamine, N-methyl-N-nonadecylamine and N-methyl-N-eicosylamine, N-ethyl-N-octylamine, N-ethyl-N-decylamine, N-ethyl-N-dodecylamine, N-ethyl-N-tridecylamine, -ethyl-N-tetradecylamine, N-ethyl-N-pentadecylamine, N-ethyl-N-bexadecylamine, N-ethyl-N-heptadecylamine, N-ethyl-N-octadecylamine, N-ethyl-N-nonadecylamine and N-ethyl-N-eicosylamine and mixtures thereof.

The anhydride-containing polymer can be any addition type polymer having anhydride groups, for example, a copolymer of a polyolefin such as polyethylene, polypropylene, polystyrene with an unsaturated organic anhydride such as maleic anhydride.

The resulting HMAP compound includes amide-containing units which have —C(O)NR$^1$R$^2$ amide groups and —COOH groups. Preferably, the HMAP includes from about 1 mole percent to about 30 mole percent amide-containing units, more preferably from about 5 mole percent to about 10 mole percent amide-containing units. The —COOH groups preferably are neutralized by reaction with an alkali metal hydroxide such as NaOH, KOH, etc. The resulting material can form as a superabsorbent gel which can be treated with an alkali metal halide (e.g., NaCl, KCl) to provide a viscous fluid.

In another embodiment, the HMAP can be made from a copolymer containing fatty groups (e.g., $C_8$ to $C_{36}$ straight or branched chain aliphatic groups) and anhydride functionality. Such a polymer can be made by copolymerizing a $C_8$ to $C_{36}$ olefin (e.g., octene, decene, dodecene, tridecene, tetradecene, pentadecene, hexadecene, heptadecene, octadecene, nonadecene, eicosene, etc.) with an unsaturated anhydride (e.g., maleic anhydride). A preferred copolymer is octadecene-maleic anhydride copolymer, which is commercially available from Sigma-Aldrich Chemical Co. of Milwaukee Wis. The HMAP is preferably made by reacting the copolymer with an alkali (e.g., NaOH, KOH) in an aqueous solution so as to form anionic sites on the polymer chain.

Preparation of a wet strength paper product can be achieved by adding a wet strength agent (e.g., PAE) to the paper pulp furnish under suitable reaction conditions. By way of illustration, reaction conditions can include ambient temperature, a pH of from about 7.3 to about 7.5, and a reaction time of 1 to 10 minutes, for example). Typically, the wet strength agent is added as an aqueous solution of from about 3% to about 1% or less.

The HMAP can be added to the furnish either before or after the cationic wet strength resin. The pulp is then formed into sheets which are then dried by conventional means. Optionally, the sheets can be heat cured, for example, in a forced air oven.

Advantageously, the HMAP of the present invention further enhances the retention of non-substantive softeners which are non-ionic and do not form chemical linkages to cellulose fibers. The HMAP serves as a molecular carrier to facilitate retention of the non-substantive softeners by the cellulose fibers. Non-substantive softeners include, for example, fatty alcohols and their esters, fatty acid esters such as sorbitan fatty acid esters, alkoxylated fatty alcohols, e.g., those obtained from the reaction of a fatty alcohol with ethylene oxide, propylene oxide, etc., or mixtures thereof, esters of polyethylene glycols and/or polypropylene glycols with fatty acids, Guerbet alcohols, and mixtures thereof. The aforementioned fatty alcohols can possess one or two terminal hydroxyl groups, e.g., lauryl alcohol, palmityl alcohol, stearyl alcohol, dimer fatty alcohols, and the like, and the fatty acid moiety of the aforementioned fatty acid esters can be derived from fatty acid moieties containing one or two carboxylic acid groups, e.g., lauric acid, palmitic acid, stearic acid, dimer fatty acids, and the like.

Guerbet alcohols ("Guerbahols") are produced by the catalytic condensation of a lower alcohol ("the Guerbet reaction") to produce a higher molecular weight branched alcohol. The Guerbet alcohols typically have the formula $R^3CH_2CH_2CHR^3CH_2OH$ wherein $R^3$ is an aliphatic group containing at least 8 carbon atoms. Preferred Guerbet alcohol molecules contain from about 20 to about 60 carbon atoms. In particular, a preferred Guerbet alcohol composition is available under the designation Guerbahol HMW, a mixture of 50% $C_{20}$ Guerbet alcohols, 25% $C_{40}$ Guerbet alcohols and 25% $C_{60}$ Guerbet alcohols, available from Colonial Chemical Inc. of South Pittsburg, Tenn.

It has been found that Guerbet alcohols can serve as softeners for paper tissue and towels and increases the wet/dry ratio percentage. The Guerbet alcohol is added to the pulp furnish and preferably combined with the HMAP of the invention as an emulsion.

Features of the invention are illustrated by the following Examples.

EXAMPLE 1

British handsheets were prepared to a target basis weight of about 55 g/m$^2$ using an unrefined furnish of 1:1 bleached hardwood and softwood Kraft pulps. A number of tests were performed in which tests designated as D-1 and D-2 were in accordance with the present invention and the remaining tests were for comparison purposes. The test results are set forth in table below. In each test, to prepare the handsheets 10 g of fibers at 3% consistency were treated for 5 minutes with a selected dosage of AMRES LA-12 PAE wet strength (W.S.) resin as a 1% aqueous solution. In tests A-1, A-2, C-1, C-2, D-1, D-2, and E-1, E-2, the dosage of Amres LA-12 was 20 pounds per metric ton (lbs/ton). In tests B-1, B-2, B-3, the dosage of Amres LA-12 was 8 lbs/ton.

The mixture was then diluted with 10 liters of tap water and the pH was adjusted to 7.5±0.2. Then, either CMC, HMAP, a non-hydrophobically modified anionic polyelectrolyte ("AP"), or nothing further, was added. In tests A-1, A-2, and B-1, B-2 no further additive was used. In tests C-1 and C-2, CMC was added at a dosage of 4 lbs/ton. In tests D-1 and D-2 the HMAP of the present invention was employed at a dosage of 1.6 lbs/ton. In tests E-1 and E-2, a non-hydrophobically modified anionic polyelectrolyte ("AP") was used, also at a dosage of 1.6 lbs/ton.

HMAP was prepared by treating 2.4197 g (0.0165 mol) of polyethylene-co-maleic anhydride with 0.4149 g (0.0015 mol) N-methyl-N-octadecylamine in refluxing acetone overnight, evaporating the acetone in vacuo, and redissolving in 200 mL of a solution of 0.0564 g of NaOH in deionized water to yield a superabsorbent gel. The latter was 1.58% solids. An 112.87 g aliquot of the gel was treated with 4.58 g of a saturated aqueous solution of sodium chloride to provide a highly viscous fluid. The pH of the fluid was 10.

The non-hydrophobically modified AP was prepared by treating 2.1439 g (0.0170 mol) of polyethylene-co-maleic anhydride with about 0.08 g (0.0014 mol) N-ethyl-N-methylamine in stirring acetone in a sealed flask at room temperature for two days, evaporating acetone in vacuo, and redissolving in a solution prepared by mixing 17 mL 1.0 N NaOH and 50 mL deionized water to yield a viscous fluid at pH 6.4. A few drops of 10 N NaOH was added to bring pH to 7.5 and provide a clear colorless fluid having a solids content of 4.473%.

Sheets were formed at pH 7.5, pressed between blotters, but without plates, at 15 psi for 5 minutes, then dried on a rotating dryer drum, cured at 105° C. for 5 minutes in a forced air oven, and tested for the properties set forth in the table below.

Charge density was determined by titration using a Mutek PCD-02 streaming current detector and standardized DADMAC or PVSK reagents.

Dry tensile and wet tensile strengths were determined by standard testing of 3" strips in an Instron type tester.

Breaking length ("B.L.") is a measure of tensile strength and denotes the length of paper strip which would be self supporting if held vertically.

As can be seen from the data in the table below, the HMAP of the invention performed comparably with CMC. However, the dosage of HMAP was only 1.6 lbs/ton as compared with 4 lbs/ton of the CMC. That is, when using the HMAP wet strength enhancement additive of the present invention, a reduction of 60% by weight of dosage can be achieved. The average wet tensile strength produced by the HMAP of the invention (i.e., 1123 grams/1") is superior to the test results achieved by using wet strength agent Amres LA-12 alone (i.e., 934 grams/1" for tests A-1,2, and 777 grams/1" for tests B-1,2,3). Moreover, the average wet breaking length achieved by the HMAP of the invention (i.e., 0.81) is also superior to the wet breaking length achieved by wet strength agent Amres LA-12 alone (i.e., 0.66 average for tests A-1,2 and 0.55 average for tests B-1,2,3).

The importance of the hydrophobic component of the HMAP is illustrated by the fact that the average wet B.L./dry B.L. for the HMAP of the invention was 32% whereas the average wet B.L./dry B.L. ratio for the non-hydrophobically modified AP was only 26.3%.

TABLE

Properties of Handsheets Within, and Outside, the Scope of the Invention

| Handsheets | W.S. Resin lbs/ton | CMC lbs/ton | HMAP[1] lbs/ton | AP[2] lbs/ton | Mutek Charge (mL) | Basis Wt. (g/m$^2$) | Dry Tensile (g/1") | Dry B.L. (Km) | Wet Tensile (g/1") | Wet B.L. (Km) | Wet/Dry B.L. (%) |
|---|---|---|---|---|---|---|---|---|---|---|---|
| A-1[3] | 20 | 0 | 0 | 0 | cationic | 54.3 | 2801 | 2.12 | 964 | 0.69 | 32.4 |
| A-2[3] | 20 | 0 | 0 | 0 | cationic | 55.7 | 3173 | 2.24 | 903 | 0.64 | 28.5 |
| Avg A-1, 2 | — | — | — | — | cationic | 55.0 | 2987 | 2.18 | 934 | 0.66 | 30.4 |
| B-1[3] | 8 | 0 | 0 | 0 | −0.016 | 54.1 | 3401 | 2.48 | 798 | 0.58 | 23.4 |
| B-2[3] | 8 | 0 | 0 | 0 | −0.022 | 55.7 | 2981 | 2.11 | 747 | 0.53 | 25.1 |
| B-3[3] | 8 | 0 | 0 | 0 | −0.025 | 55.7 | 3337 | 2.33 | 786 | 0.55 | 23.5 |
| Avg B-1, 2, 3 | — | — | — | — | −0.021 | 55.2 | 3240 | 2.30 | 777 | 0.55 | 24.0 |
| C-1[3] | 20 | 4 | 0 | 0 | −0.030 | 55.9 | 3963 | 2.79 | 1226 | 0.86 | 30.9 |
| C-2[3] | 20 | 4 | 0 | 0 | −0.018 | 54.7 | 3749 | 2.70 | 1292 | 0.93 | 34.5 |
| Avg C-1, 2 | — | — | — | — | −0.024 | 55.3 | 3856 | 2.75 | 1259 | 0.90 | 32.7 |
| D-1[4] | 20 | 0 | 1.6 | 0 | −0.016 | 56.7 | 3672 | 2.55 | 1239 | 0.86 | 33.8 |
| D-2[4] | 20 | 0 | 1.6 | 0 | −0.017 | 56.7 | 3326 | 2.52 | 1006 | 0.76 | 30.3 |
| Avg D-1, 2 | — | — | — | — | −0.017 | 56.7 | 3499 | 2.53 | 1123 | 0.81 | 32.0 |
| E-1[3] | 20 | 0 | 0 | 1.6 | −0.066 | 52.9 | 4127 | 3.07 | 1047 | 0.78 | 25.4 |
| E-2[3] | 20 | 0 | 0 | 1.6 | −0.048 | 56.1 | 4268 | 2.99 | 1161 | 0.81 | 27.2 |
| Avg E-1, 2 | — | — | — | — | −0.057 | 54.5 | 4198 | 3.03 | 1104 | 0.80 | 26.3 |

[1]Polyethylene-co-maleic anhydride having 7.8 mole percent N-methyl-N-octadecylamide (hydrophobic) units.
[2]Polyethylene-co-maleic anhydride having 7.8 mole percent N-methyl-N-methylamide (non-hydrophobic) units.
[3]Outside the scope of the invention.
[4]Within the scope of the invention.

EXAMPLE 2

British handsheets were prepared in accordance with the procedure set forth in Example 1 with a dosage of 20 lbs/ton Amres LA-12, except that the HMAP employed was a polyethylene-co-maleic anhydride polymer containing 7.8 mole percent octadecylamide units made in accordance with the following procedure:

A flask was charged with 7.29 g (0.059 mol) polyethylene-co-maleic anhydride, 1.22 g (0.0045 mmol) octadecylamine and 100 mL acetone, and heated at reflux with stirring over a two day period. The acetone was removed under vacuum and the solids were dissolved in a stirred solution of 4.37 g sodium chloride and 4.62 (0.12 mol) sodium hydroxide in 863 mL deionized water over a 24 hour period to yield a hazy viscous fluid having an active polymer solids content of 1.3% by weight. A dosage of 1.6 lbs/ton of the resulting HMAP was employed to prepare the handsheets.

The handsheets were tested in accordance with the procedures set forth in Example 1 and exhibited the following properties:

| | |
|---|---|
| Mutek charge | −0.023 mL |
| Basis weight | 54.9 g/m$^2$ |
| Dry tensile | 3552 g/1" |
| Dry breaking length | 2.6 km |
| Wet tensile | 1019 g/1" |
| Wet breaking length | 0.74 km |
| Wet/dry tensile % | 29% |

EXAMPLE 3

British handsheets were prepared in accordance with the procedure set forth in Example 1 with a dosage of 20 lbs/ton Amres LA-12, except that the HMAP employed was prepared from a polyoctadecene-co-maleic anhydride polymer and alkali in accordance with the following procedure.

A beaker was charged with 2.24 g (0.56 mol) sodium hydroxide, 800 mL deionized water, and 10 g (0.0289 mol) polyoctadecene-co-maleic anhydride. The polyoctadecene-co-maleic anhydride was obtained from Sigma-Aldrich Chemical Co. under the product number designation 41,911-7. The slurry was stirred over a water bath at 70° C. for 3 hours to provide a clear, colorless solution having 1.496% by weight solids content. A dosage of 3.9 lbs/ton of the resulting HMAP was used to prepare the hand sheets.

The handsheets were tested in accordance with the procedure set forth in Example 1 and exhibited the following properties.

| | |
|---|---|
| Mutek charge | −0.051 mL |
| Basis weight | 56.5 g/m$^2$ |
| Dry tensile | 3721 g/1" |
| Dry breaking length | 2.6 km |
| Wet tensile | 1059 g/1" |
| Wet breaking length | 0.74 km |
| Wet/dry tensile % | 29% |

EXAMPLE 4

British handsheets were prepared in accordance with the procedure set forth in Example 1 with a dosage of 20 lbs/ton Amres LA-12 except as follows.

HMAP was prepared from polyethylene-co-maleic anhydride and octadecylamine and combined with a Guerbet alcohol in accordance with the following procedure.

A flask was charged with 7.29 g (0.058 mol) polyethylene-co-maleic anhydride, 1.22 g (0.0045 mol) octadecylamine, and 100 mL acetone and heated at reflux with stirring overnight. The solution was transferred to a beaker and allowed to thoroughly evaporate over a hot water bath. The solids were then dispersed by stirring in a solution of 4.59 g (0.114 mol) sodium hydroxide, 4.49 g sodium chloride, and 8.19 g Guerbahol HMW in 863 mL deionized water over the weekend to yield a white emulsion having a pH of 10 and an active polymer solids of 1.395%.

The HMAP and Guerbahol HMW were added to the pulp furnish as a combined emulsion at respective dosages of 1.6 lbs/ton and 1 lb/ton to prepare the handsheets.

The handsheets were tested and exhibited the following properties:

| | |
|---|---|
| Mutek charge | −0.014 mL |
| Basis weight | 54.7 g/m$^2$ |
| Dry tensile | 3656 g/1" |
| Dry breaking length | 2.6 km |
| Wet tensile | 1032 g/1" |
| Wet breaking length | 0.74 km |
| Wet/dry tensile % | 28% |
| Guerbahol retention % | 56% |

EXAMPLE 5

British handsheets were prepared in accordance with the procedure set forth in Example 1 with a dosage of 25 lbs/ton Amres LA-12 except as follows.

HMAP, prepared from polyoctadecene-co-maleic anhydride reacted with alkali (sodium hydroxide), was combined with Guerbahol HMW in accordance with the following procedure.

A beaker was charged with 2.28 g (0.057 mol) sodium hydroxide, 800 ml deionized water, 10 g (0.029 mol) polyoctadecene-co-maleic anhydride, and 2.39 g Guerbahol HMW, and stirred over a water bath at 70° C. for 3 hours to provide a white emulsion having an active polymer solids of 1.646%. The polyoctadecene-co-maleic anhydride was obtained from Sigma-Aldrich Chemical Co. under the product number designation 41,911-7.

The HMAP and Guerbahol HMW were added to the pulp furnish as a combined emulsion at respective dosages of 5.6 lbs/ton and 1 lb/ton to prepare the handsheets.

The handsheets were tested and exhibited the following properties:

| | |
|---|---|
| Mutek charge | −0.016 mL |
| Basis weight | 55.7 g/m$^2$ |
| Dry tensile | 2938 g/1" |
| Dry breaking length | 2.1 km |
| Wet tensile | 970 g/1" |
| Wet breaking length | 0.68 km |
| Wet/dry tensile % | 33% |
| Guerbahol retention % | 60% |

COMPARATIVE EXAMPLE

This Comparative Example is outside the scope of the invention.

British handsheets were prepared in accordance with the procedure set forth in Example 1 with a dosage of 20 lbs/ton Amres LA-12 except as follows.

An emulsion of Guerbahol HMW and PEG-600-monolaurate was prepared as follows:

A beaker was charged with 13 g Guerbahol HMW. A solution of 1.19 g Lumulse 60-L brand PEG-600-monolaurate in 15 mL deionized water treated with a tiny amount of Dow Anti-foam was slowly added to the Guerbahol HMW while stirring using a PowerGen 700 Emulsifier fitted with a OMNI-Tip® Plastic Disposable Rotor Stator Generator Probe at about 13000 rpm until a smooth white emulsion was obtained (about 30 min) having a solids of 44.54%.

CMC was added to the pulp furnish at a dosage of 4 lbs/ton and the Guerbahol HMW emulsion was added at a dosage of 1 lb/ton of Guerbahol HMW to produce the handsheets.

The handsheets were tested and exhibited the following properties:

| | |
|---|---|
| Mutek charge | −0.031 mL |
| Basis weight | 55.6 g/m² |
| Dry tensile | 4219 g/1" |
| Dry breaking length | 3.0 km |
| Wet tensile | 1312 g/1" |
| Wet breaking length | 0.93 km |
| Wet/dry tensile % | 31% |
| Guerbahol retention % | 38% |

As can be seen from Examples 4 and 5, the Guerbet alcohol retention achieved by the HMAP of the invention was significantly higher (56% and 60%) than the Guerbet alcohol retention achieved by CMC in the Comparative Example (38%).

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

The invention claimed:

1. A method for making a cellulosic paper to enhance its wet strength and softness, the method comprising:
    a) providing a pulp furnish containing at least one cellulosic component possessing anionic sites;
    b) adding separately to the pulp furnish to form a treated pulp,
        i. cationic wet strength resin possessing cationic sites which bond to anionic sites on the cellulosic component of the pulp furnish, there being present cationic wet strength resin possessing unbound cationic sites, and
        ii. anionic polyelectrolyte possessing anionic sites and hydrophobic groups, with anionic sites of the anionic polyelectrolyte bonding to unbound cationic sites of the wet strength resin;
    c) forming the treated pulp into a sheet; and,
    d) drying the sheet,
    wherein the anionic polyelectrolyte is made by reacting a polymeric compound having anhydride groups with an amine having the formula:

$HNR^1R^2$ wherein $R^1$ and $R^2$ are each selected from the group consisting of hydrogen and a saturated or unsaturated, straight chain or branched aliphatic group having from 1 to 36 carbon atoms, with the proviso that at least one of $R^1$ and $R^2$ is a hydrophobic saturated or unsaturated, straight chain or branched aliphatic group having from about 8 to about 36 carbon atoms, and wherein the polymeric compound having anhydride groups is a copolymer of ethylene and maleic anhydride and the amine is octadecylamine or N-methyl-N-octadecylamine.

2. The method of claim 1 wherein the hydrophobic aliphatic group possesses from about 12 to about 24 carbon atoms.

3. The method of claim 1 wherein the anionic polyelectrolyte includes from about 5 mole percent to about 10 mole percent octadecylamide or N-methyl-N-octadecylamide units.

4. The method of claim 1 wherein the anionic polyelectrolyte is made by reacting a polyolefin-co-maleic anhydride with the amine in a solvent to form an intermediate product, separating the intermediate product from the solvent and dissolving the intermediate product in an aqueous alkali solution to form a gel, and then treating the gel with an alkali halide solution.

5. The method of claim 1 wherein the adding step (b) is performed under reaction conditions including ambient temperature, a pH of from about 7.3 to about 7.5, and a reaction time of from about 1 minute to 10 minutes.

6. The method of claim 1 wherein the pulp furnish comprises an aqueous slurry of kraft pulp.

7. The method of claim 1 wherein the anionic polyelectrolyte is combined with a non-substantive softener.

8. The method of claim 7 wherein the non-substantive softener is selected from the group consisting of fatty alcohol, fatty alcohol ester, fatty acid ester, alkoxylated fatty alcohol, esters of polyethylene glycol and/or polypropylene glycol with fatty acid, Guerbet alcohols and mixtures thereof.

9. The method of claim 8 wherein the alkoxylated fatty alcohol is an ethoxylated, propoxylated, or ethoxylated and propoxylated fatty alcohol and the fatty acid ester is a sorbitan fatty acid ester.

* * * * *